US008117557B2

(12) United States Patent
Dotson et al.

(10) Patent No.: US 8,117,557 B2
(45) Date of Patent: Feb. 14, 2012

(54) MULTI-MODE VIEWER CONTROL FOR VIEWING A SERIES OF STATISTICAL VALUES

(75) Inventors: Gerald A. Dotson, Brier, WA (US); J. Dennis Dotson, Madison Lake, MN (US)

(73) Assignee: People Driven Performance, Inc., Madison Lake, MN (US)

( * ) Notice: Subject to any disclaimer, the term of this patent is extended or adjusted under 35 U.S.C. 154(b) by 651 days.

(21) Appl. No.: 12/319,146

(22) Filed: Dec. 30, 2008

(65) Prior Publication Data

US 2009/0183106 A1  Jul. 16, 2009

Related U.S. Application Data

(60) Provisional application No. 61/010,122, filed on Jan. 4, 2008, provisional application No. 61/009,960, filed on Jan. 3, 2008, provisional application No. 61/009,991, filed on Jan. 4, 2008.

(51) Int. Cl.
*G06F 3/048* (2006.01)
*G06F 17/00* (2006.01)
*G09G 5/22* (2006.01)

(52) U.S. Cl. ...... 715/771; 715/970; 715/215; 345/440.2

(58) Field of Classification Search .................. 715/842, 715/771, 970, 215; 345/440, 440.2, 629
See application file for complete search history.

(56) References Cited

U.S. PATENT DOCUMENTS

| | | | |
|---|---|---|---|
| 6,700,575 B1 * | 3/2004 | Bovarnick et al. | 345/440 |
| 6,952,808 B1 * | 10/2005 | Jamieson et al. | 715/771 |
| 7,567,203 B2 * | 7/2009 | Dizaji et al. | 342/90 |
| 7,800,613 B2 * | 9/2010 | Hanrahan et al. | 345/440 |
| 2003/0135087 A1 * | 7/2003 | Hickle et al. | 600/26 |
| 2004/0225648 A1 * | 11/2004 | Ransom et al. | 707/3 |
| 2006/0167704 A1 * | 7/2006 | Nicholls et al. | 705/1 |
| 2006/0253418 A1 * | 11/2006 | Charnock et al. | 707/1 |
| 2009/0063598 A1 * | 3/2009 | Player | 708/201 |
| 2009/0217183 A1 * | 8/2009 | Moyne et al. | 715/762 |

* cited by examiner

*Primary Examiner* — Weilun Lo
*Assistant Examiner* — Dino Kujundzic
(74) *Attorney, Agent, or Firm* — Lowe Graham Jones PLLC

(57) ABSTRACT

Methods, systems, and techniques for presenting a series of values of statistical data using numeric data and interpretive information are provided. Example embodiments provide a stat viewer control that allows a user to toggle seamlessly between a numeric view of the data and an interpreted view, the interpreted view presenting value judgments associated with the data. In one embodiment, the interpreted view is based at least in part upon one or more rules for interpreting the numeric data as belonging to one or more zones, each zone corresponding to a background emanating from a ring of an archery target representation. This abstract is provided to comply with rules requiring an abstract, and it is submitted with the intention that it will not be used to interpret or limit the scope or meaning of the claims.

22 Claims, 15 Drawing Sheets
(12 of 15 Drawing Sheet(s) Filed in Color)

Stat Viewer Control in Context

*101* Period selector
*102* Stat-pac viewer

*103* Stat Viewer Control

*Fig. 1*

Interpretation rule change

903 — Rule change marker
Information request button — 905

904 — Rule change marker
Information request button — 906

Histogram view

Interpreted view, comparison mode

1101

1102

Histograph view, comparison mode

1201

1202

MULTI-MODE VIEWER CONTROL FOR VIEWING A SERIES OF STATISTICAL VALUES

TECHNICAL FIELD

The present disclosure relates to methods, systems, and techniques for presenting and managing data and, in particular, techniques for the viewing and management of statistics using a user interface control adapted to same.

BACKGROUND

Oft times, users wish to view different types of data in comparison to other data. For example, managers who wish to view different aspects of a manufacturing process over time may wish to view a day's data along with last month's data. In addition, such users may invoke various statistical tools to help analyze the data, especially as it becomes large. One problem with many such tools is that they tend to be either graphical in nature or numeric. Also, many tools cannot be combined with other tools, and thus various "dashboards" or user interfaces may be used to present suites of different tools to users.

For example, such information may be presented to users using various types of graphical diagrams, such as using charts and graphs. In some cases, pie charts may be used to present a comparison of quantitative information by dividing a circle into multiple sections, with the relative size of each section reflecting a proportion of a corresponding quantity relative to the other quantities. In other cases, bar charts may be used to present a comparison of quantitative information with respect to a common metric (e.g., a amount of sales, costs, incidents, etc.) by using parallel bars of varying lengths, with the relative length of each bar corresponding to a relative quantity. Another form of bar chart is a Gantt chart, which may be used to present progress of a project with multiple tasks relative to time.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is an example screen display that illustrates an example stat viewer used in an example context.

DETAILED DESCRIPTION

Figure 2:
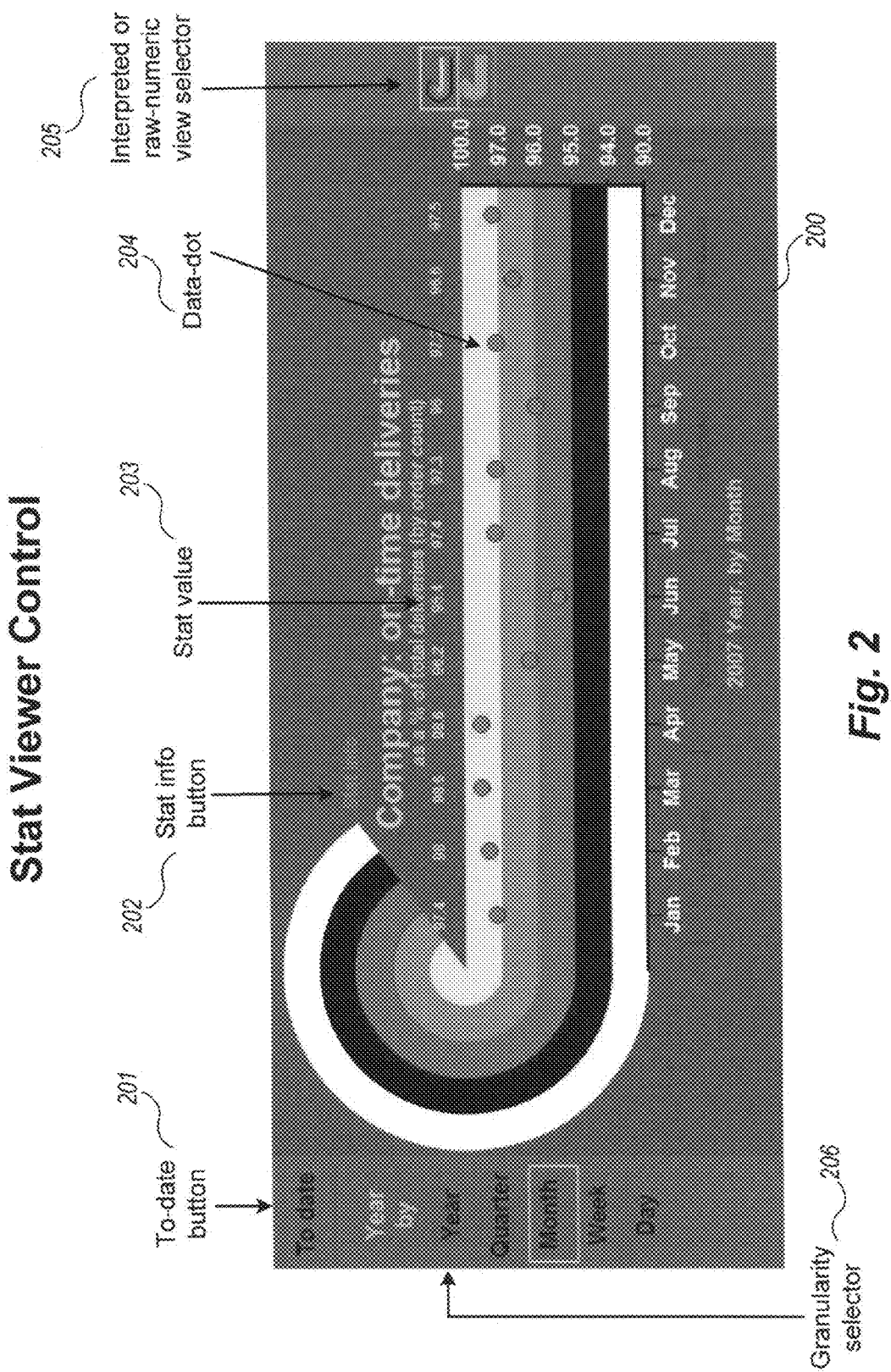
FIG. 2 is an example screen display that illustrates example components of an example stat viewer control.

Embodiments described herein provide enhanced computer- and network-based methods, systems, and techniques for displaying a series of statistical data values in a manner amenable to easy interpretive judgment without loss of numeric information. Example embodiments provide a statistics viewer user interface control referred to as a stat viewer or stat viewer control, which enables users to define one or more statistics and to illustrate the data values of the respective statistics against defined interpretive rules for quick perusal and/or judgment of performance. In overview, the stat viewer control provides a raw data mode and an interpreted data mode which can be used together to aid users in understanding the significance of raw data without a lot of additional information.

The stat viewer is a user interface control that allows users to view a series of values for a statistic ("stat"), such as values for a selected statistic over time or frequency (e.g., a time series of values for a statistic). The stat viewer can be used to view values that change over other parameters; however time based values are illustrated to provide a comprehensive example. A user can elect to view the time series values as raw numerical measurements (e.g., in a numeric view) or in an interpreted view where each raw measurement has been pre-judged relative to a scale, for example, from good to bad. A predefined judgment rule is used to convert a raw numerical measurement to an interpreted value (e.g., a good-bad scale value). The interpreted view has the advantage that the user need not be familiar with the details of the measurement to know if a displayed value is good or bad; the user can observe this directly from the displayed graphic. The user is also able to see a visual representation of the judgment rule that was used to convert the measurement from the numeric scale to the good-bad scale.

In a typical embodiment, the stat viewer control can be used with additional user interface controls that help a user choose a particular time-period and a particular statistic to view. FIG. 1 is an example screen display that illustrates an example stat viewer control used in an example context. The stat viewer control 103 can also be used in other contexts and with other types of user interface controls. In the illustrated example, the user has chosen the year "2007" using the period selector 101 as the period of interest and has chosen an "on-time delivery" stat as the statistic to view using the stat selector control 102. The stat viewer control 103 is currently shown displaying the values of on-time delivery for each month over the year 2007. The details of this view are further described with respect to FIG. 2. Other statistics are available and the user can choose any available stat to view using the stat selector control 102. In the example illustrated in FIG. 1, the user has selected a stat for display by clicking on the stat's title (e.g., "on-time delivery") in the target graph displayed by the stat selector control 102.

FIG. 2 is an example screen display that illustrates example components of an example stat viewer control. The visual metaphor being displayed in the display area 200 of the stat viewer control is that of a "roll-out" of the statistic over a series, such as time. Each value of the statistic, for example stat value 203, is displayed as a "data-dot" 204 (also referred to as a "dot") on a horizontal axis. The stat info button 202 causes the stat viewer to broadcast a stat-info-request event. Another component listening to this event (related or not to the stat viewer control) could be configured to display additional information on the stat being displayed, such as how the stat is measured and management strategies for controlling the stat. The data-dot 204 can be configured to display additional information via visual indicators attached to it, as described further below with respect to FIG. 13. Also, when a user clicks on a data-dot, such as a data-dot 204, the stat viewer control broadcasts a data-info-request event. Other components listening for this event (related or not to the stat viewer control) could provide additional information about the data represented by the data-dot 204, and could also provide the user with navigation to reports related to the stat and the period that the data-dot represents. The to-date button 201 simultaneously displays the stat values for various periods to-date, e.g., year-to-date, quarter-to-date, month-to-date, etc., for comparison purposes. The granularity selector button 206 allows a user to select the frequency of the stat values to display. For example, in response to a selection of year-by-month using the granularity selector button 206, the stat viewer control is shown currently displaying the values of the on-time delivery statistic for each month of the selected year (2007).

The view selector 205 allows the user to toggle between a raw numeric view and an interpreted view. In FIG. 2, the stat is currently shown in interpreted view. In interpreted view, stats are displayed according to a judgment scale of some nature, such as a "good-bad" value scale. Previously, someone or some system has made a judgment (interpretation) about how the various raw numeric values should be translated to the judged (e.g., good-bad) values. Accordingly, the raw numeric values currently displayed in FIG. 2 are displayed consistent with this interpretation. In interpreted view, every stat is shown against the same value scale (e.g., good-bad) background, for example, of colored zones, good being towards the top of the axis. Notice that the stat's raw numeric value is also displayed at the top of the graph immediately above its associated data-dot.

In the particular embodiment of FIG. 2, the stats are displayed against a value scale background using the colors associated with an archery target with its standard 5 zones and standard 5 colors. The archery target metaphor is used because the symbol is a familiar visual object that people likely have seen before and can likely immediately recognize. People who know what an archery target represents will intuitively grasp that values emanating from the center are better than values emanating from the outer rings. The interpreted view of a stat viewer control displays statistics as part of a "scoreboard" or dashboard that makes it easy for people to understand at a glance how well things have gone over successive periods of time. Other visual objects or images may be similarly incorporated to place and display numeric values on a judgment scale.

Additional information may also be displayed relative to an interpretive view. For example, the zones (rings) of the interpreted view can be labeled. An example of zone labeling from the top down (or the inner ring toward the outside) is: outstanding, excellent, good, fair, and poor. The number of zones and the colors assigned to each can be configured as desired. In addition, other systems of backgrounds may be used with the interpreted view. For example, one could configure the background as a rectangle with colored horizontal bands, patterned bands, or using other metaphors.

In the interpreted view it is easy for a user, even someone unfamiliar with a particular statistic, to tell whether it was a good month or a bad month by simply glancing at the graph (the display of the stat viewer control). Even for someone familiar with the particular statistic, the interpreted view can convey an immediate understanding of the significance of the data being displayed.

Figure 3:
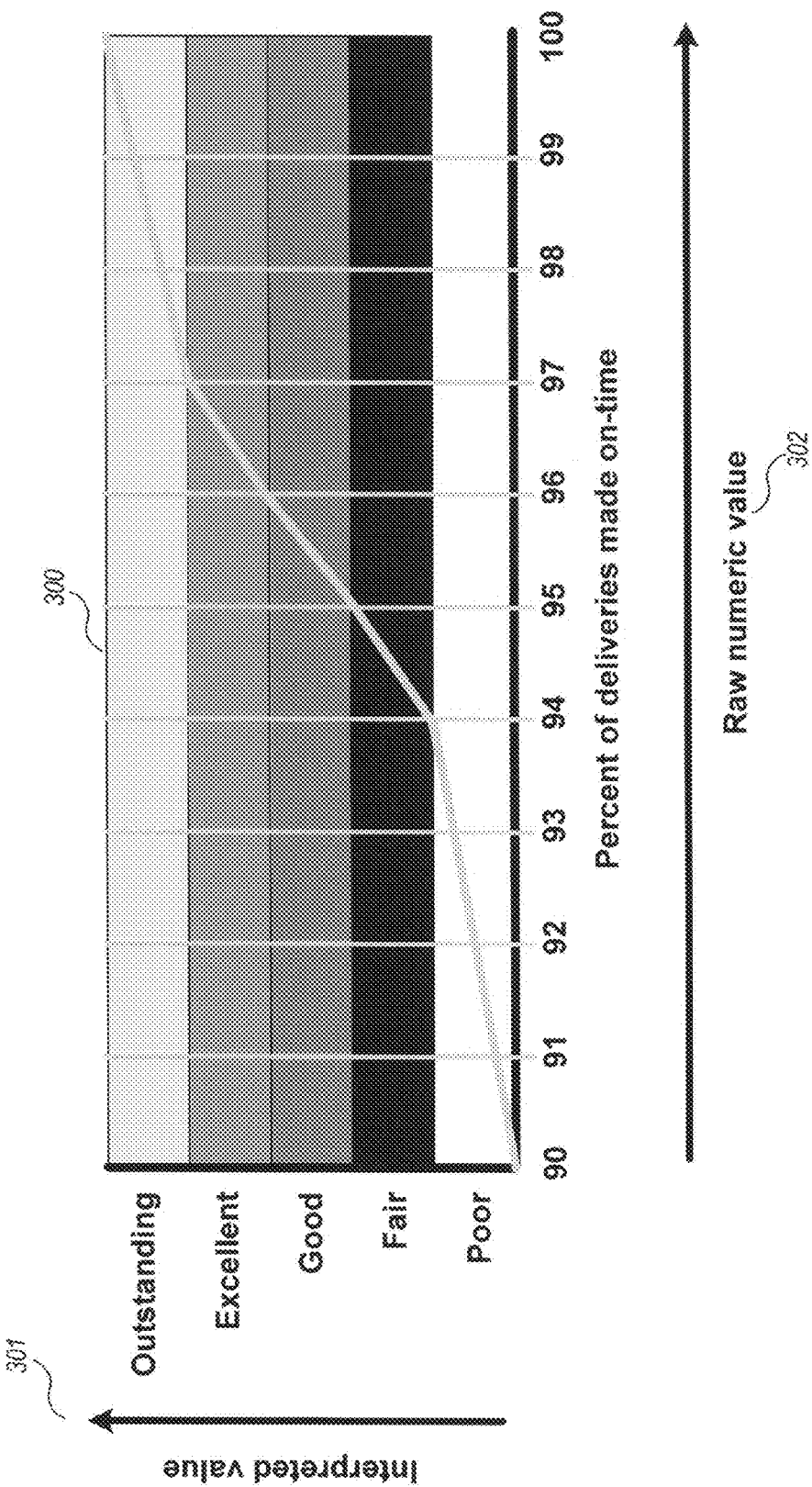
FIG. 3 is an illustration of an example interpretation rule for a statistic.

FIG. 3 is an illustration of an example interpretation rule for one of the statistics. The graph 300 in FIG. 3 shows the relationship between the raw numeric values 302 of the on-time delivery stat (as an example) and the interpreted values 301 of the same stat. A person or a computer program familiar with the stat can set the ranges for each interpretation zone. For example, a company work group might use its judgment to set the different ranges for the stat as part of its goal setting for the year. Using this graph (or any data representation thereof), any raw numeric value can be mapped to its interpreted value automatically (i.e., without further human intervention). Interpretation rules may be encoded or stored in a variety of ways, including as functions yielding scalar outputs, business rules attached to database objects, graphs, lookup tables, etc.

Figure 4:
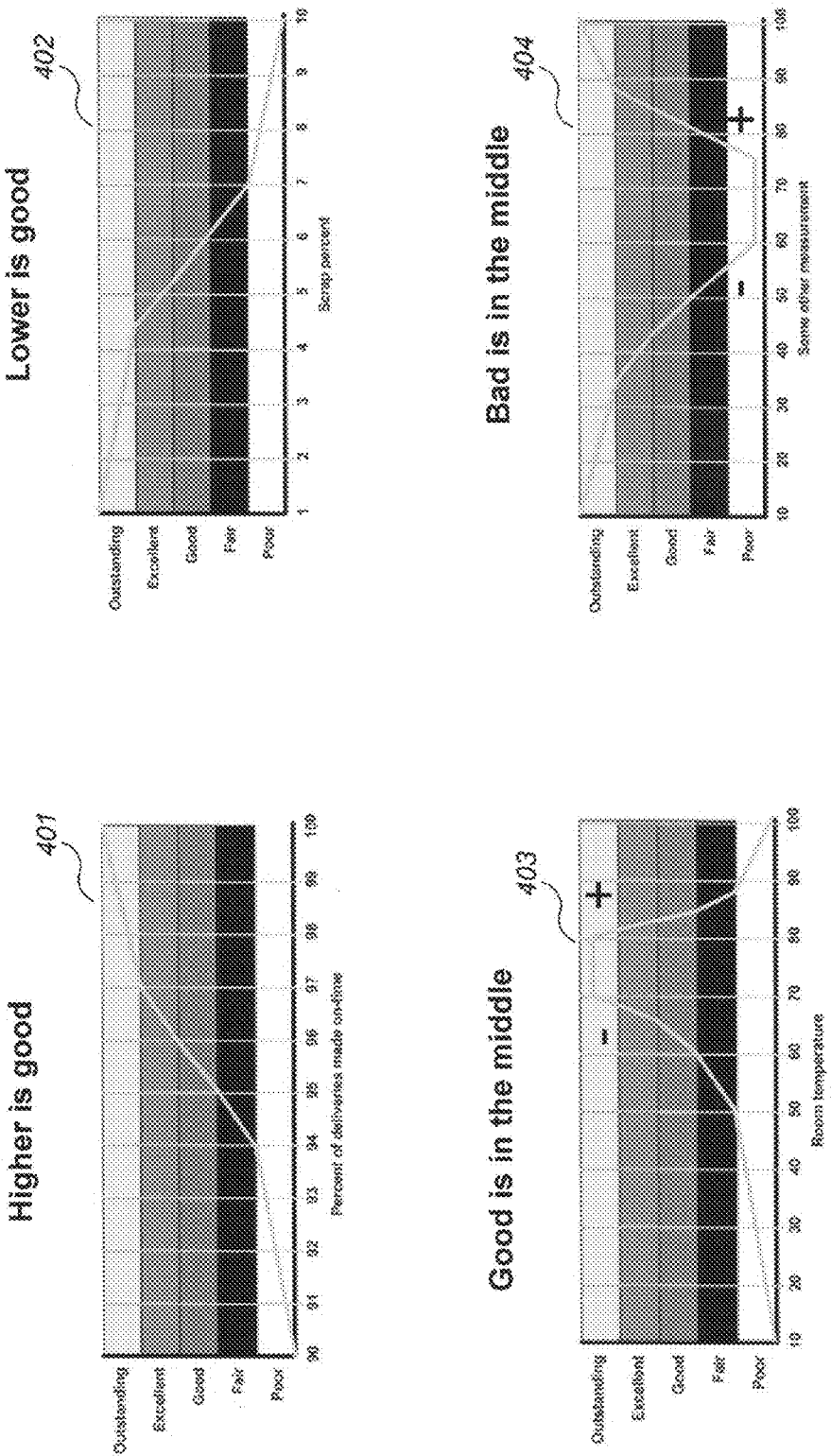
FIG. 4 illustrates how different types of statistics can be mapped to interpreted values.

FIG. 4 shows how different types of statistics can be mapped to interpreted values. In particular, FIG. 4 demonstrates four basic types of stats: stats in which higher numbers are better (for example, graph 401); stats in which lower numbers are better (for example, graph 402); stats in which numbers somewhere in between are better (for example, graph 403); and stats in which numbers somewhere in between are worse (for example, graph 404). Notice that for the "good in the middle" and "bad in the middle" type of stats there are two zones marked "+" and "−" depending on which side of the hill or valley the raw numeric value resides. These flags may be used in association with the data-dots in the interpreted view to indicate to the user on which side of the hill or valley the data value lies.

In some situations, some stats may not be amenable to display in an interpreted view, in which case raw numeric values are displayed at the top of the graph but no interpreted data-dots are plotted in the respective zone area.

Figure 5:
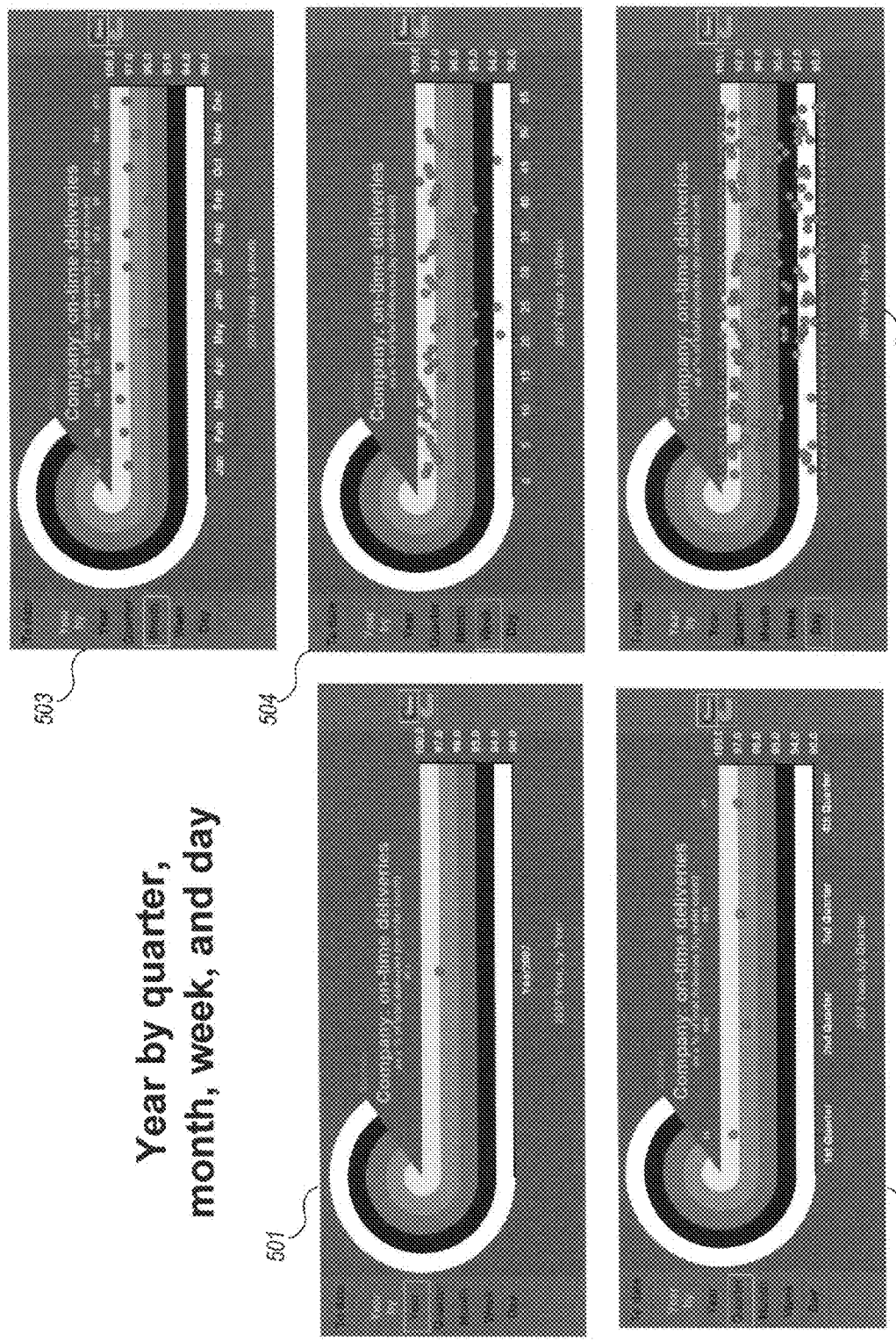
FIG. 5 illustrates example values for an example statistic over a year broken out by quarter, month, week, and day.

As mentioned, in addition to selecting the period to display, the user can choose a granularity in which to view the period (for example using granularity selector button 206 of FIG. 2). FIG. 5 illustrates example values for an example statistic over the year broken out by quarter, month, week, and day. In particular, stat viewer display 501 shows a single (aggregate) value for the year (e.g., 2007); stat viewer display 502 shows 4 aggregate values for each of the four quarters of the selected year; stat viewer display 503 shows 12 aggregate values for each of the twelve months of the selected year; stat viewer display 504 shows 52 aggregate values for each of the fifty-two weeks of the selected year; and stat viewer display 505 shows 365 days worth of values for each day of the selected year. Accordingly, the user can adjust the view of the data being displayed (e.g., the data dots) by adjusting the granularity (e.g., using selector button 206 of FIG. 2) without additional user actions.

Figure 6:
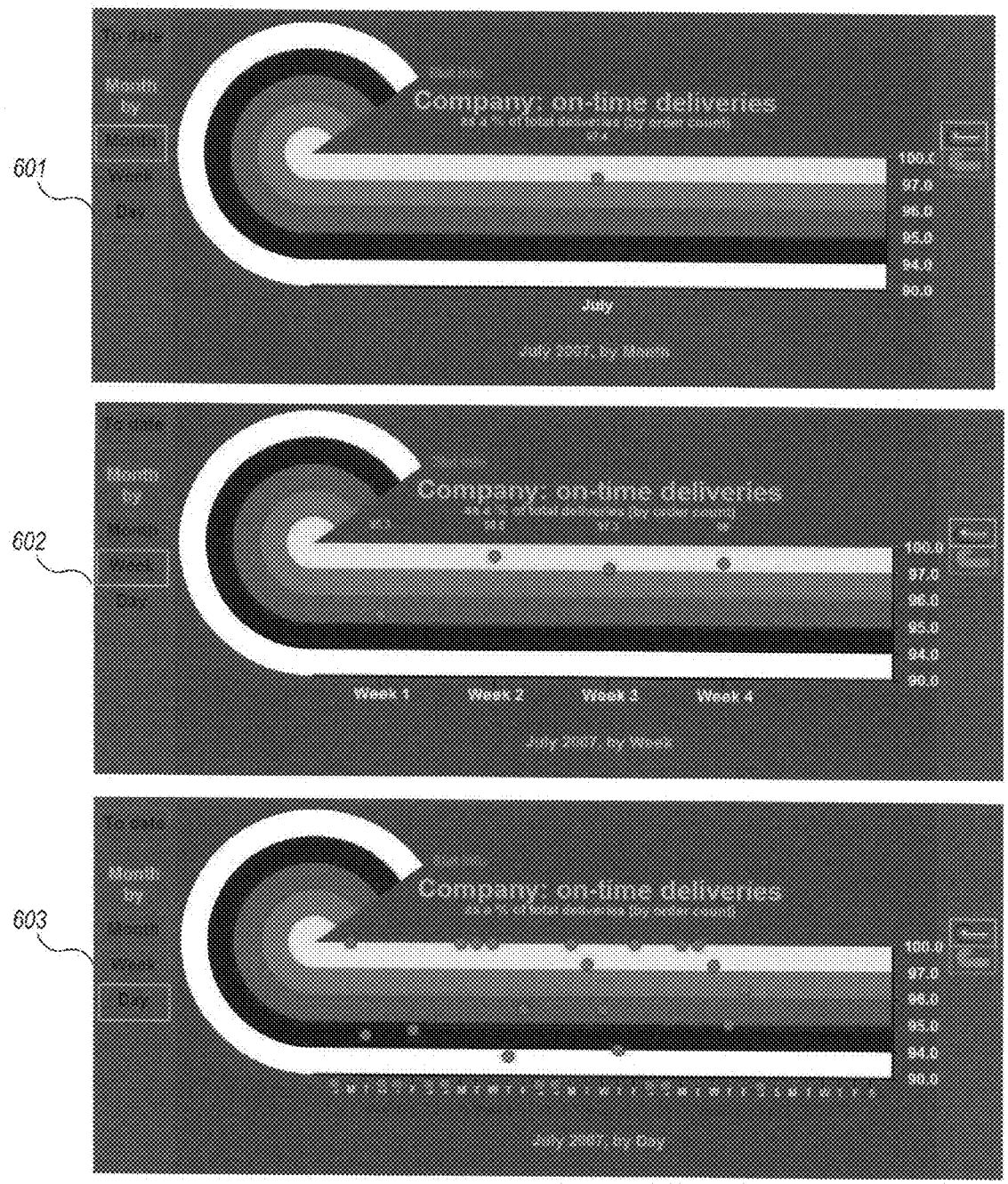
FIG. 6 illustrates granular views for example values of an example statistic where a month has been selected as the period to view.

FIG. 6 illustrates the granular views for values of an example statistic where a month has been selected as the period to view. In particular, stat viewer display 601 shows a single (aggregate) value for the selected month; stat viewer display 602 shows 4 aggregate values for each of the four weeks of the selected month; stat viewer display 603 shows 28 values for each of the days of the selected month. Other selected periods can be decomposed and represented in similar ways. Note that, for the purposes of convenience, the stat viewer control uses months of exactly four weeks, 28 days. In other embodiments, the actual fractional number of weeks and varying number of days as actually present in a month may be similarly accommodated.

Figure 7:
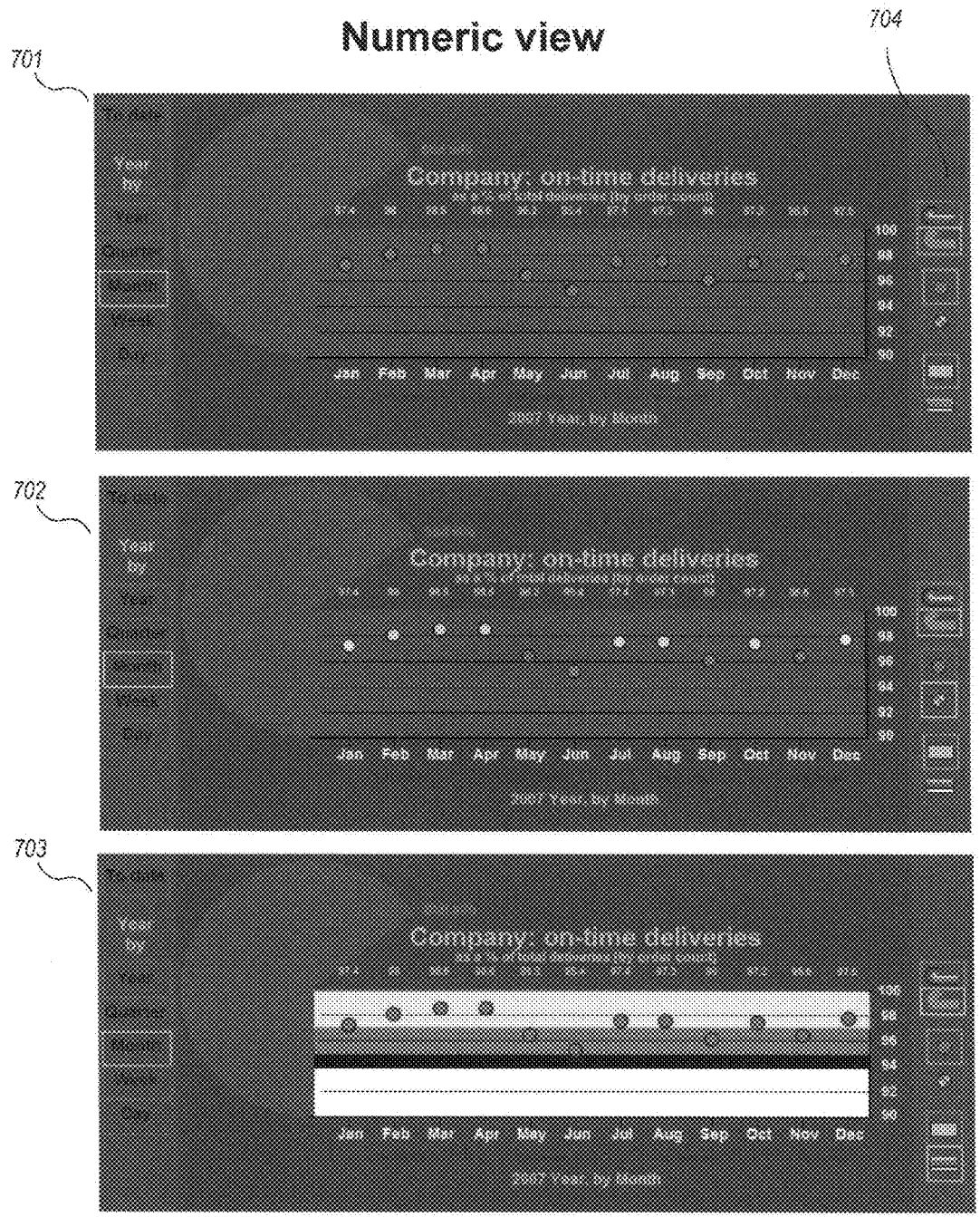
FIG. 7 illustrates an example raw numeric view of a selected example statistic.

FIG. 7 illustrates an example raw numeric view of a selected example statistic. In numeric view, the stat viewer control may provide additional user interface controls 704 to control additional attributes of the view when the control is displayed in raw numeric view mode. The additional user interface controls 704 can be seen in more detail in FIG. 8. The mode toggle button 802 can be used to select between raw numeric view and interpreted view. In stat viewer display 701 the data is presented "raw," i.e., without any interpreted judgment. When in raw numeric view, the user can elect to present the data-dots in color by toggling on the dot color toggle button 803, where each dot's color is presented in the same color as the color of the interpreted zone that the stat value falls within. The Stat viewer display 702 shows the same view as display 701 with the data-dots colored to match their interpreted values. In some embodiments, while in raw numeric view, the user can also elect to present the interpretation ranges in the background on, for example, the vertical axis, by toggling on the background toggle button 804. Stat viewer display 703 shows the same view as display 701 with the interpretive zones superimposed in the background so that the user can see the relationship between the raw numeric and interpreted views.

Figure 8:
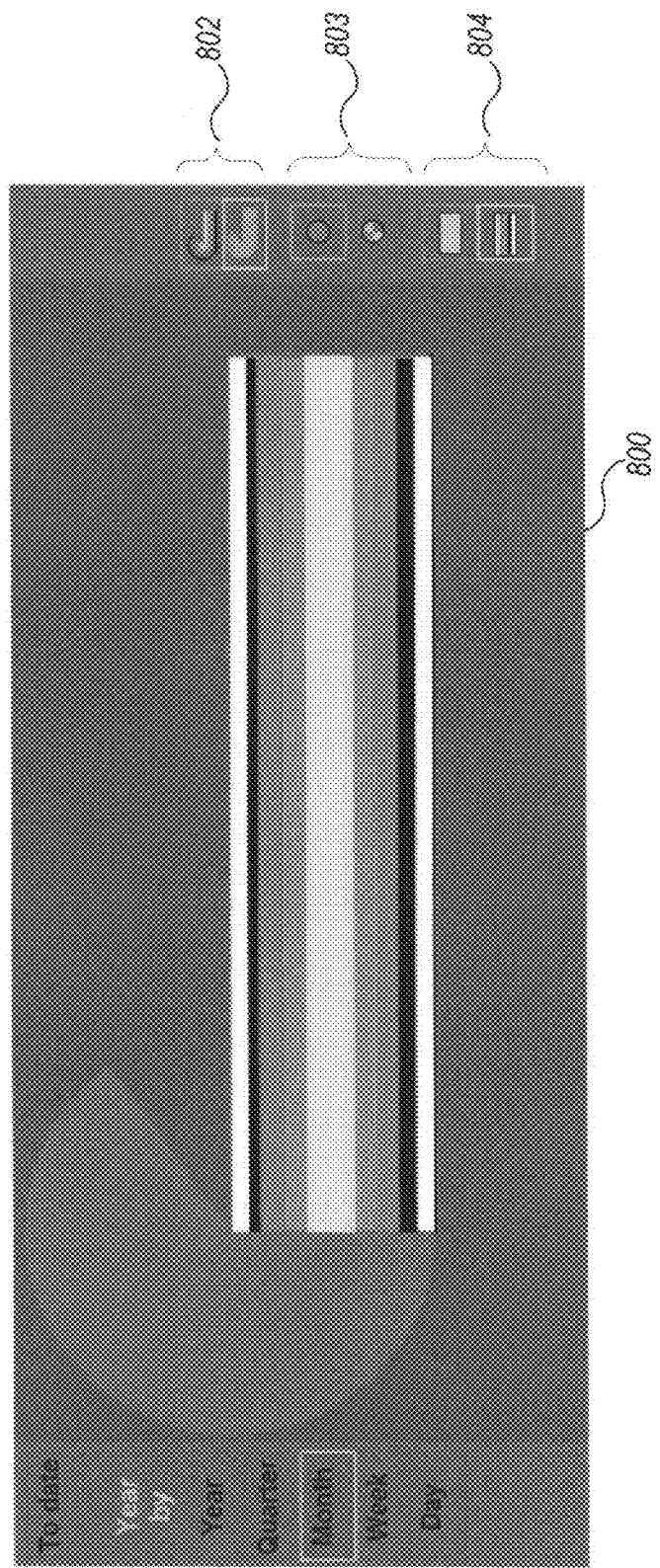
FIG. 8 illustrates an example interpretive background for a stat whose stat type is "good in the middle."

FIG. 8 illustrates an example interpretive background for a stat whose stat type is "good in the middle." This type of stat was described with reference to graph 403 in FIG. 4. That the values are "good in the middle" is exemplified by the yellow field in the middle of the background. As described with respect to FIG. 7, the user interface controls 802, 803, and 804 in stat viewer control 800 can be used to adjust the view when displayed in raw numeric view mode.

Figure 9:
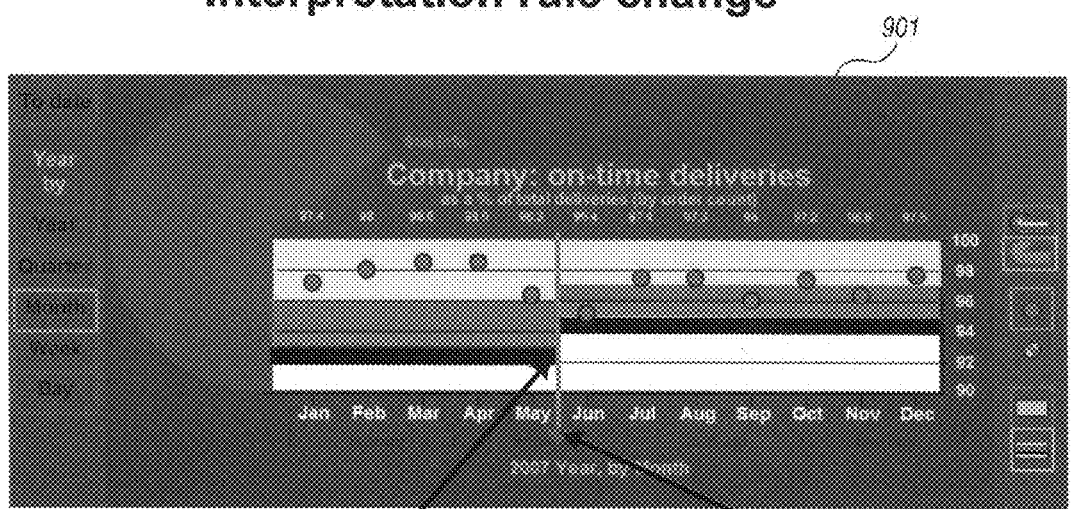
FIG. 9 illustrates example displays that occur when a rule change is implemented.
Figure 9:
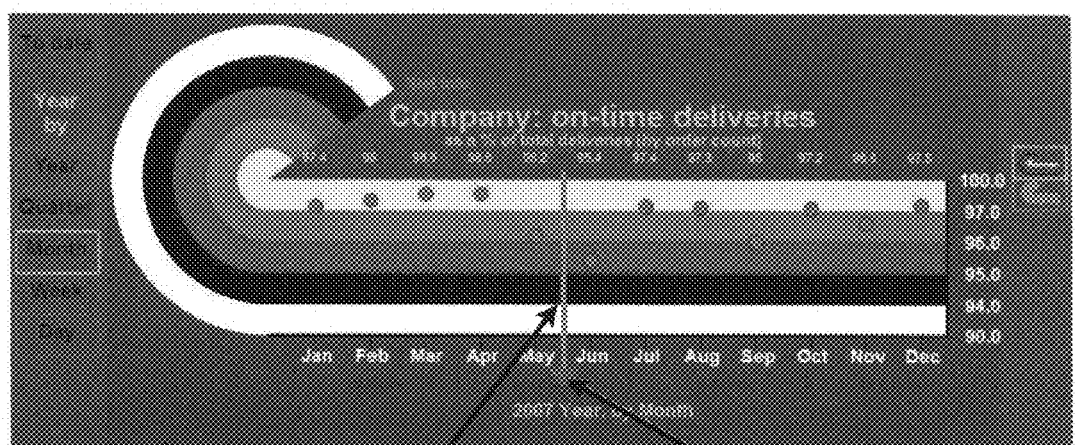

In some situations, it may be appropriate to change the interpretation rule for a stat during a course of time. For example, suppose a major change has been made in a company's production methodology and now it is easier for the company to produce a higher number of items in a given amount of time. FIG. 9 illustrates example displays that occur when a rule change is implemented. For example, stat viewer control display 901 shows how such a rule change is presented in a raw numeric view, and stat viewer display 902 shows how such a rule change is presented in an interpreted view. In this example, a change of rule is made between May and June as indicated by the vertical gray line (rule change markers 903 and 904). If the user selects the information request button below the rule change marker (button 905 or 906), an explanation of and justification for the rule change may be displayed. Other indications of rule changes can be similarly accommodated.

Figure 10:
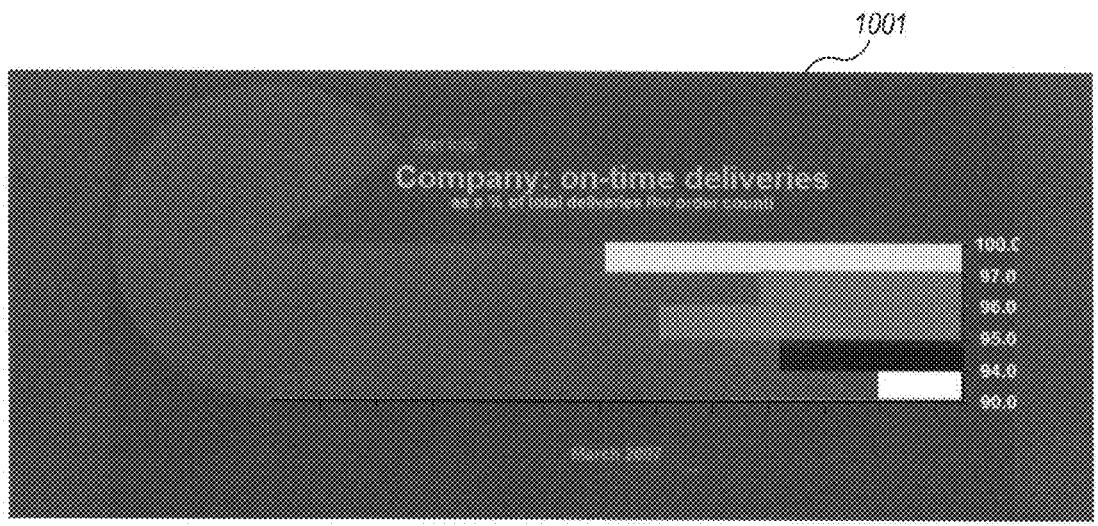
FIG. 10 illustrates different histograms for a time series of example stat values for a selected example period.
Figure 10:
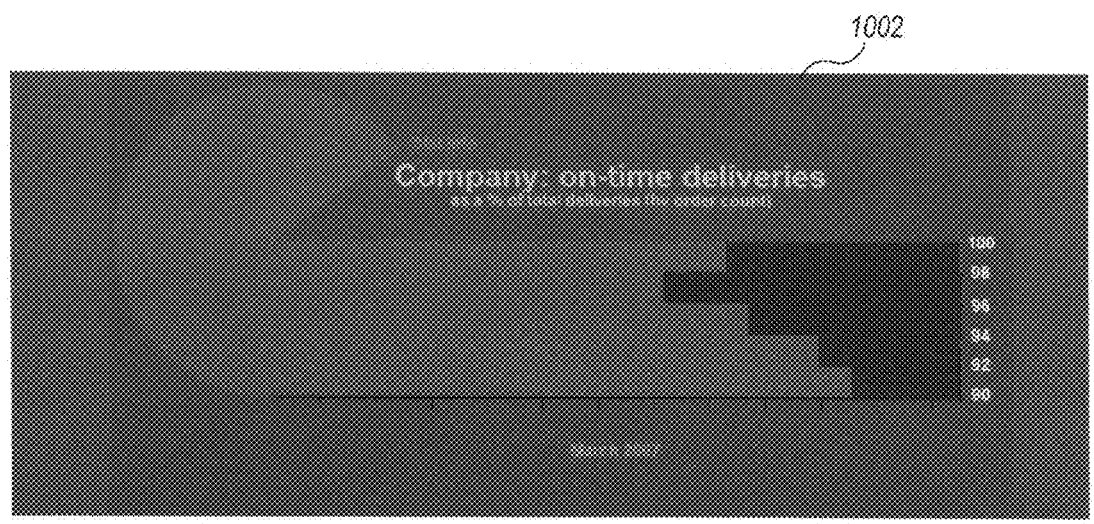

In some embodiments, the user can also elect to view a statistic's data values in a histogram view. FIG. 10 illustrates different histograms for a time series of example stat values for a selected example period. Stat viewer display 1001 shows a histogram plotted in an interpreted view and stat viewer display 1002 shows a histogram plotted in a raw numeric view of the same statistic. A user control for evoking the histogram view is not shown.

Note that a user can easily switch among any of these views with one or two input device actions such as mouse clicks.

Figure 11:
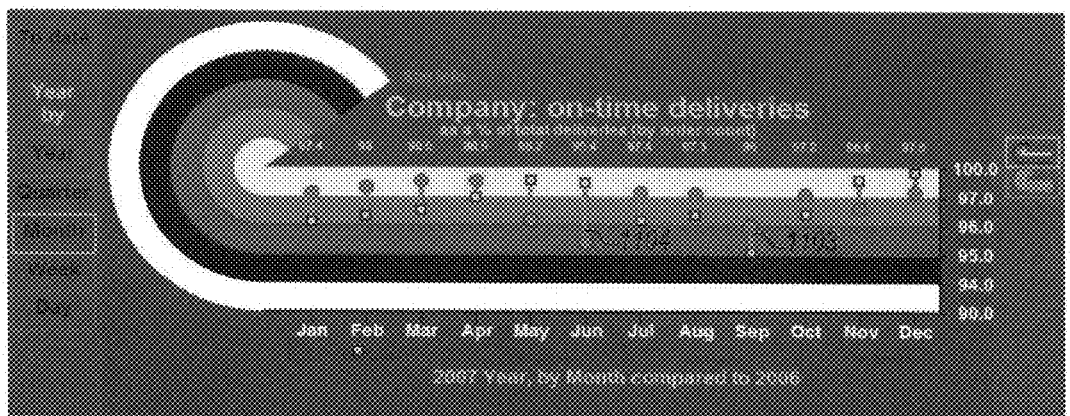
FIG. 11 illustrates stat values for a selected year period compared to a selected compare-to period by month.
Figure 11:
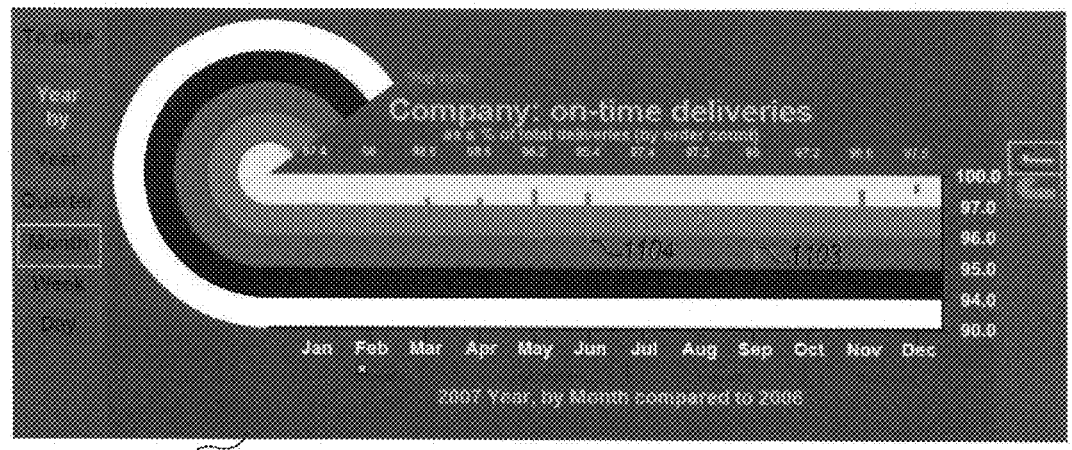

In some embodiments, a comparison feature is available that allows a user to compare statistical values from one time period with those of another. Specifically, once stat values from one period (a "focus" period) are displayed, the user can select a second period as a "compare to" period. FIG. 11 illustrates stat values for a selected year period (e.g., 2007) compared to a selected compare-to period (e.g., 2006) by month. In one embodiment, the values for the original (focus) period are shown with different shapes, colors, or other indications than the values for the compare-to period. For example, in stat viewer display 1101, the values from the compare-to period are displayed as square data-dots while the values for the focus period continue to display as round data-dots. Further, in one example embodiment, the length of the colored line that connects a round data-dot (associated with the focus period) with its corresponding square data-dot (associated with the compare-to period) represents the difference in value between the two periods, whereas the color of the line represents whether the change was for good or for bad. For example, in the example illustration, cyan represents a good change (e.g., line 1103), and magenta a bad change (e.g., line 1104). From the visual feedback, the user is then able to focus on the line lengths and colors to get a quick impression of the differences between the two periods. Other indicators for differences in value and for indicating judgment can be similarly incorporated.

Also as shown in stat viewer display 1102 in FIG. 11, the user can elect to turn the data-dots off and simply view the comparison lines. A user control for turning dots on and off is not shown. Turning the dots off reduces screen clutter and makes it easier to focus on the differences between compared values (the lines). Also, a comparison mode can be applied to the raw numeric view (not shown) in a similar manner. The user can still elect to view the raw numeric dots and/or background in colors representing the interpreted zones within which the dots fall.

Figure 12:
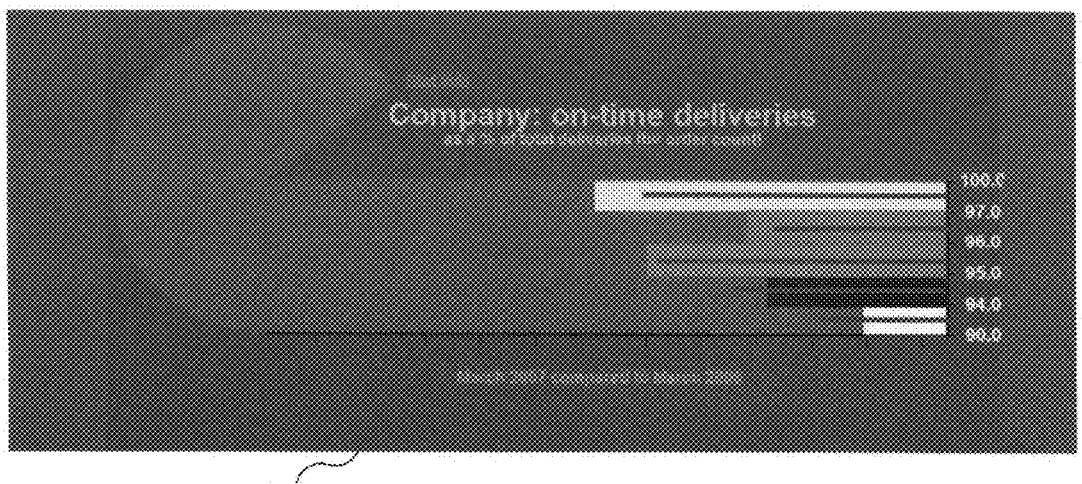
FIG. 12 illustrates use of comparisons with an example histogram view.
Figure 12:
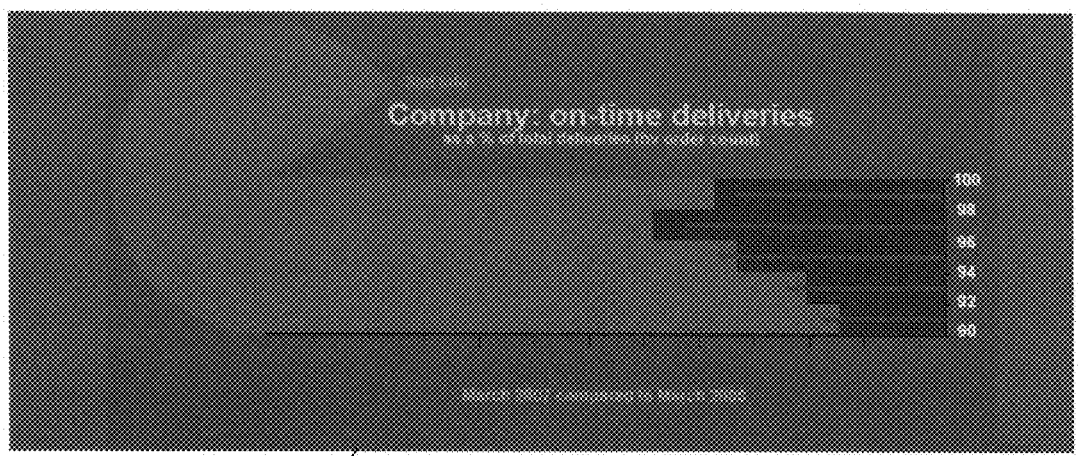

FIG. 12 illustrates use of comparisons with an example histogram view. The dark gray lines in the example stat viewer displays 1201 and 1202 represent the compare-to period against the standard histogram bars of the focus period. Again, quick impressions can be formed from the visual cues.

Figure 13:
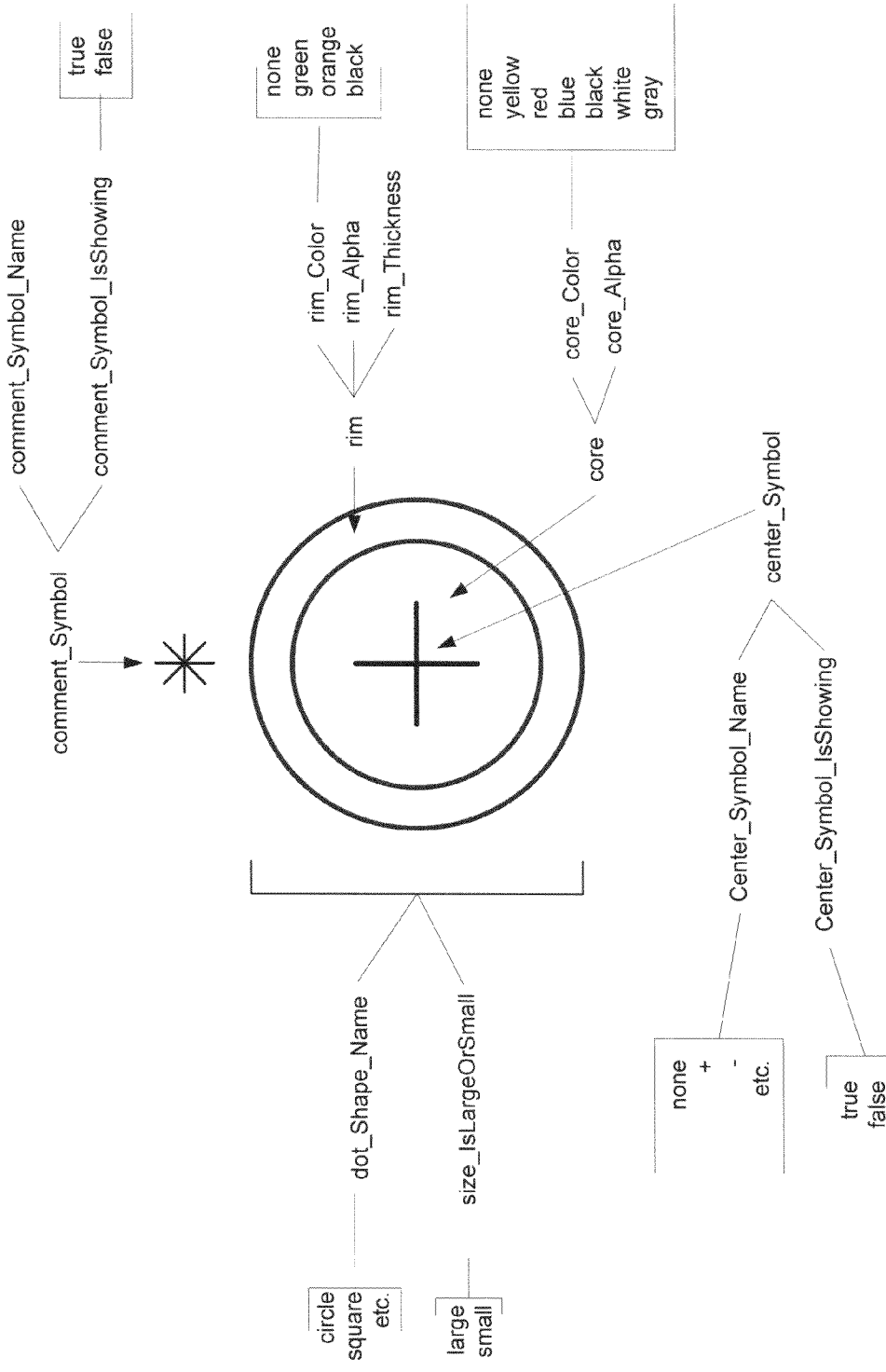
FIG. 13 illustrates dot enhancements and other configuration attributes.

The examples described demonstrated data-dots as either colored squares or circles. Of note, data-dots can be configured in many different ways to add additional or different meaning. For example, data-dots with hollow centers could be used to indicate that no data is available. Also, for example, dots can take on other shapes for other meanings. Other configurations include enhancements such as coloring the rim around a data-dot and flagging data-dots with a color, icon, shape, graphic, etc. to signify particular properties. In some embodiments, a character may be placed in the center of the dot to indicate that additional information is available. For example, a "C" could be used to indicate that there is a comment about this particular data-dot, and the user can get access to the comment by clicking on the data-dot. FIG. 13 illustrates some of these dot enhancements and other configuration attributes.

Figure 14:
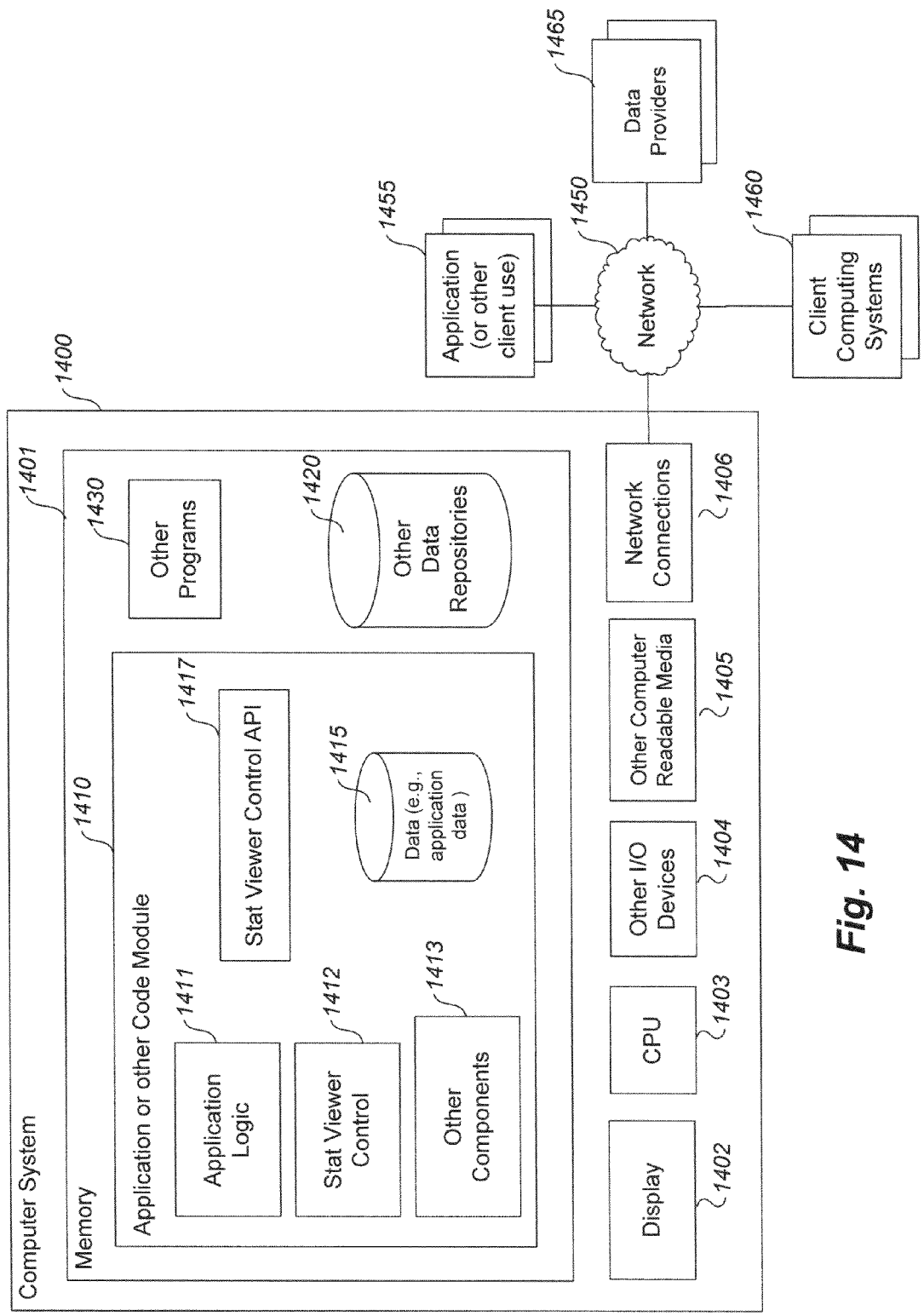
FIG. 14 is an example block diagram of an example computing system that may be used to practice embodiments of an example stat viewer user interface control.

FIG. 14 is an example block diagram of an example computing system that may be used to practice embodiments of an example stat viewer user interface control as described herein. Note that a general purpose or a special purpose computing system suitably instructed to perform the functions and behaviors described herein may be used to implement a stat viewer control. Further, the stat viewer control may be implemented in software, hardware, firmware, or in some combination to achieve the capabilities described herein. In a typical embodiment, the stat viewer control is implemented by or used by one or more other code modules as a data display, organization, management, and navigation tool. In some embodiments, the stat viewer control may support an application programming interface ("API") to communicate with an instance of a stat viewer control. Also, in some embodiments, the stat viewer control may communicate with other modules and/or code logic using events or messages as described above.

A computing system 1400 used to implement a stat viewer control may comprise one or more server and/or client computing systems and may span distributed locations. In addition, each block shown may represent one or more such blocks as appropriate to a specific embodiment or may be combined with other blocks. Moreover, the various blocks of the application or other code module or logic 1410 incorporating a stat viewer control may physically reside on one or more machines, which use standard (e.g., TCP/IP) or proprietary interprocess communication mechanisms to communicate with each other.

In the embodiment shown, computer system 1400 comprises a computer memory ("memory") 1401, a display 1402, one or more Central Processing Units ("CPU") 1403, Input/Output devices 1404 (e.g., keyboard, mouse, CRT or LCD display, etc.), other computer-readable media 1405, and one or more network connections 1406. An example application (code module or other programming logic) 1410 that incorporates one or more stat viewer controls 1412 is shown residing in memory 1401. In other embodiments, some portion of the contents, some of, or all of the components of the application 1410 or the stat viewer control 1412 may be stored on or transmitted over the other computer-readable media 1405. The components of the application 1410, including the code used to implement the stat viewer control preferably execute on one or more CPUs 1403 and manage the presentation of data, as described herein. Other code or programs 1430 and potentially other data repositories, such as data repository 1420, also reside in the memory 1410, and preferably execute on one or more CPUs 1403. Of note, one or more of the components in FIG. 14 may not be present in any specific implementation.

In a typical embodiment, the application 1410 includes one or more components including the application logic 1411 and data 1415 used to implement stat viewer control 1412. Other and/or different components (and/or modules) 1413 may be implemented. In addition, components of the application 1410 may interact via a network 1450 with application or client code 1455, one or more client computing systems 1460, and/or one or more data provider systems 1465, for example, to supply the data presented by the stat viewer control 1412. Also, of note, one or more data repositories 1415 that contains the source data used to generate data displayed by the stat viewer control 1412 may be provided external to the stat viewer control 1412, for example in a knowledge base accessible over one or more networks 1450.

In an example embodiment, the logic of the stat viewer control 1412 is implemented using standard programming techniques. However, a range of programming languages known in the art may be employed for implementing such example embodiments, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The embodiments described above may also use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments may also be supported.

In addition, programming interfaces 1417 to the stat viewer control 1412 can be made available by standard means such as through C, C++, C#, and Java APIs; libraries for accessing files, databases, or other data repositories; through scripting languages such as XML; or through Web servers, FTP servers, or other types of servers providing access to stored data. The data repositories 1415 and 1420 may be implemented as one or more database systems, file systems, or any other method known in the art for storing such information, or any combination of the above, including implementation using distributed computing techniques.

Also the example application 1410 may be implemented in a distributed environment comprising multiple, even heterogeneous, computer systems and networks. For example, in one embodiment, some or all of the application logic 1411, the stat viewer control 1412, the stat viewer control API 1417, the other components 1413 and the data 1415 are located in physically different computer systems. In another embodiment, various modules of the application 1410 are hosted each on a separate server machine. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) etc. Other variations are possible. Also, other functionality could be provided by each component/module, or existing functionality could be distributed amongst the components/modules in different ways, yet still achieve the functions of a stat viewer controller.

Furthermore, in some embodiments, some or all of the logic of the stat viewer control 1412 may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the programming logic and/or data structures may also be stored as contents (e.g., as executable or other machine-readable software instructions or structured data) on a computer-readable medium (e.g., a hard disk; a memory; a network; or cellular wireless network or other data transmission medium; or a portable media article to be read by an appropriate drive or via an appropriate connection such as a DVD or flash memory device) so as to enable or configure the computer-readable medium and/or one or more associated computing systems or devices to execute or otherwise use or provide the contents to perform at least some of the described techniques. Some or all of the logic and data structures may also be transmitted as contents of generated data signals (e.g., as part of a carrier wave or otherwise included as part of an analog or digital propagated signal) on a variety of computer-readable transmission mediums, such as media 1405, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 15:
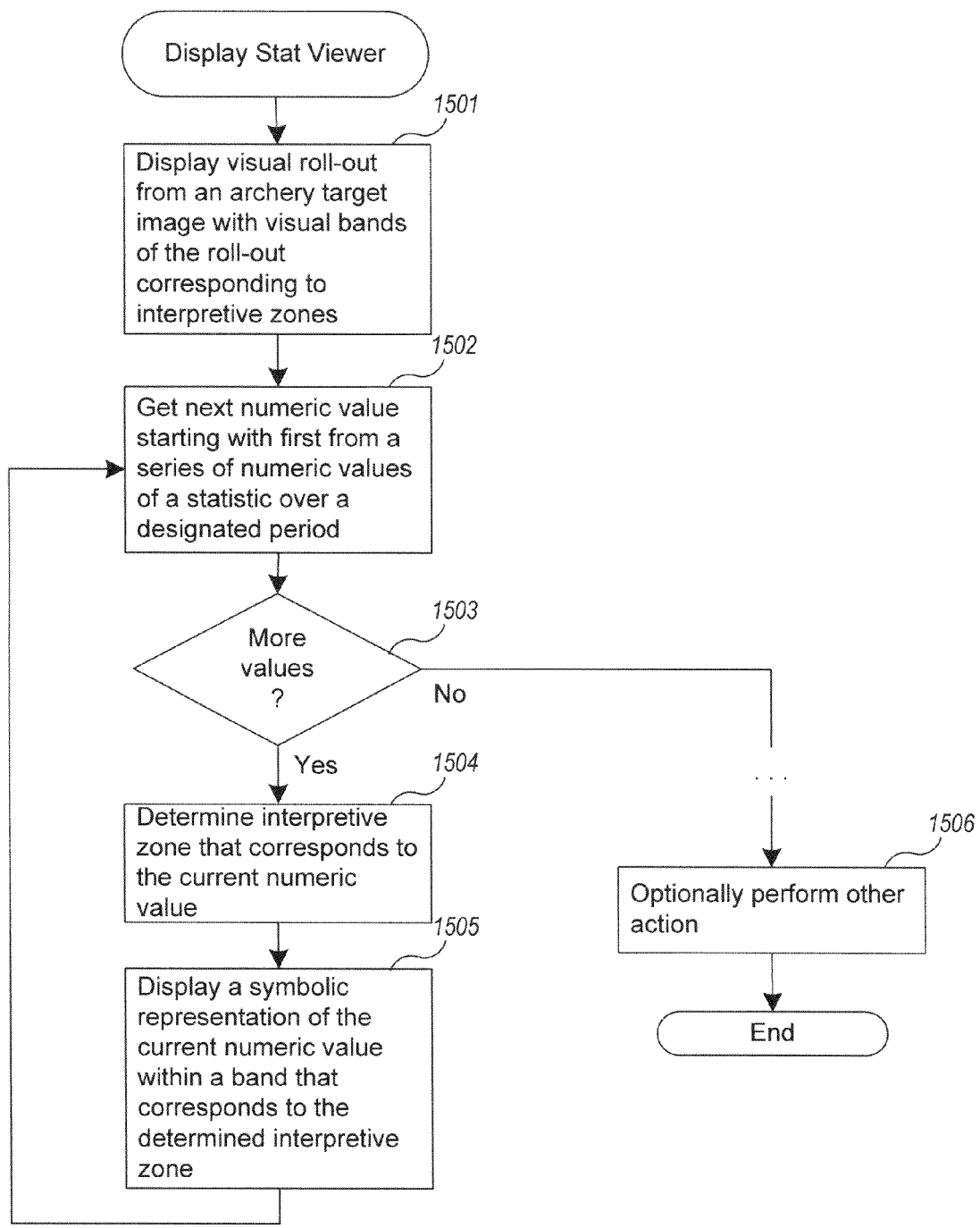
FIG. 15 is an example flow diagram of an example routine to display an embodiment of an example stat viewer control.

FIG. 15 is an example flow diagram of an example routine to display an embodiment of an example stat viewer control. The stat viewer control may be implemented, for example, by the stat viewer control 1412 shown in FIG. 14. In block 1501, the routine displays a visual roll-out from an archery target image, with the rings of the target extending in an x-direction over the roll-out representation to generate a plurality of consecutive visual bands that each correspond to one or more interpretive zones (e.g., zones corresponding to a range of value judgments, such as good-bad), such as described elsewhere. In some embodiments, each zone may be associated with a unique visual characteristic that is used to display the corresponding band (e.g., a color).

In blocks 1502-1505, the routine executes a loop to process each numeric value from a series of numeric values of a statistic over a designated period for display on the visual roll-out. Specifically, in block 1502, the routine gets a next numeric value to display from the series, and in block 1503 determines whether there are any more numeric values to process. If there are no more numeric values available in the series to process, the routine continues to block 1506 to optionally perform other actions; otherwise, the routine continues to block 1504. In block 1504, the routine determines an interpretive zone to associate with the current numeric value as described elsewhere. In block 1505, the routine displays a symbolic representation (e.g., a dot and/or other indicator as described elsewhere) of the current numeric value on the displayed visual roll-out within a band that corresponds to the interpretive zone determined at block 1504 and in a location along the x-direction of the visual roll-out (e.g., such as in a position along the x-direction that corresponds to a particular time or sub-period within the period associated with the numeric value).

If instead, at block 1503 it was determined that there are no more numeric values to process, the routine continues to block 1506 to optionally perform other operations. After block 1506, the routine ends. It will be appreciated that in other embodiments, various additional and/or other information may be presented on the visual roll-out (e.g., comparison mode, etc.), such as described elsewhere.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/010,122, entitled "Multi-mode Viewer Control for Viewing a Series of Statistical Values," filed Jan. 4, 2008; U.S. Provisional Patent Application No. 61/009,960, entitled "Method and System for Viewing and Managing Groups of Statistics Using a Multi-mode Viewer Control," filed Jan. 3, 2008; and U.S. Provisional Application No. 61/009,991, entitled "Nesting Navigator User Interface Control," filed Jan. 4, 2008, are incorporated herein by reference, in their entirety.

From the foregoing it will be appreciated that, although specific embodiments have been described herein for purposes of illustration, various modifications may be made without deviating from the spirit and scope of the invention. For example, the methods, systems, and techniques for presenting a series of values of a statistic using numeric data and interpretive information discussed herein are applicable to other architectures. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer-implemented method for presenting a series of numeric values of a statistic over a designated period of time according to a frequency, comprising:
    under control of a computing system,
        displaying on a display screen a visual representation of a roll-out from an archery target image having one or more rings emanating outward from the center of the target, each ring extending in an x-direction over the roll-out representation to generate a plurality of consecutive visual bands, wherein the lowermost band corresponds to the outside-most ring of the target and the uppermost band corresponds to the inside-most ring of the target, each band corresponding to at least one of one or more interpretive zones, each interpretive zone associated with a unique visual characteristic that is used to display the corresponding band;
        for each numeric value of the series of numeric values of the statistic over the designated period of time according to the frequency,
            determining at least one of the one or more interpretive zones to associate with the numeric value; and
            displaying on the display screen a symbolic representation of the numeric value on the displayed representation of the roll-out within the band that is associated with the determined one or more interpretive zones associated with the numeric value, simultaneously with the corresponding numeric value, such that the roll-out representation displays the symbolic representation of each value of the series in a location along an x-axis direction and a y-axis direction along with each corresponding numeric value.

2. The method of claim 1 wherein the determining the at least one of the one or more interpretive zones to associate with the numeric value is based at least in part on one or more interpretation rules that associate one or more ranges of numeric values with the at least one of the one or more interpretive zones.

3. The method of claim 1 wherein the symbolic representation of the numeric value is a dot.

4. The method of claim 1 wherein the symbolic representation of the numeric value is displayed with auxiliary notations.

5. The method of claim 1 wherein the one or more interpretive zones designate five different value judgments of the ranges of numeric values.

6. The method of claim 1 wherein the unique visual characteristic that is used to display a corresponding ring is a color.

7. The method of claim 6 wherein the colors are yellow, red, blue, black, and white.

8. The method of claim 1 wherein the consecutive visual bands represent ranges of numeric values that are characterized from bad to good in the y-axis direction.

9. The method of claim 1 wherein the frequency is at least one of day, week, month, quarter, or year.

10. The method of claim 1, further comprising:
    determining a second series of numeric values of the statistic over a designated second period of time according to a frequency; and superimposing a symbolic representation of each of the determined second series of numeric values of the statistic on the displayed representation of the roll-out such that the symbolic representation of each numeric value associated with the designated first period of time is displayed relative to the symbolic representation of each numeric value associated with the designated second period of time.

11. The method of claim 1, further comprising:
in response to an indication from a user, switching the displayed visual representation of the roll-out between a raw numeric view and an interpreted view.

12. The method of claim 1 wherein the series of numerical values of the statistic is a time series of numerical values of the statistic.

13. A non-transitory computer-readable storage medium containing contents that when executed cause a computing device to present a user interface control to display one or more series of numeric values of a statistic, by performing a method comprising:
displaying a visual representation of a roll-out from an archery target image having one or more rings emanating outward from the center of the target, each ring extending in an x-direction over the roll-out representation to generate a plurality of consecutive visual bands, wherein the lowermost band corresponds to the outside most ring of the target and the uppermost band corresponds to the inside most ring of the target, each band corresponding to at least one of one or more interpretive zones, each interpretive zone associated with a unique visual characteristic that is used to display the corresponding band;
for each numeric value of a first series of numeric values of the statistic,
determining at least one of the one or more interpretive zones to associate with the numeric value; and
displaying a symbolic representation of the numeric value on the displayed representation of the roll-out within the band that is associated with the determined one or more interpretive zones associated with the numeric value, such that the roll-out representation displays the symbolic representation of each value of the first series in a location along an x-axis direction and a y-axis direction;
determining a second series of numeric values of the statistic, each of the numeric values of the second series corresponding to a numeric value of the first series of numeric values; and
superimposing a symbolic representation of each of the determined second series of numeric values of the statistic on the displayed representation of the roll-out such that the symbolic representation of each numeric value associated with the first series is displayed relative to the symbolic representation of the corresponding numeric value of the determined second series.

14. The non-transitory computer-readable storage medium of claim 13 wherein the medium is a computer memory containing instructions that, when executed, cause a computer processor to perform the method.

15. The non-transitory computer-readable storage medium of claim 13 wherein the first series of numeric values of the statistic is a series of numeric values of the statistic over a designated first period of time, and wherein the second series of numeric values of the static is a series of numeric values of the statistic over a designated second period of time.

16. A display device configured to display a visual representation of a data structure stored in a memory, the visual representation including a plurality of interpretive bands in proximity to a representation of an archery target having one or more rings emanating outward from the center of the target, each interpretive band comprising an extension of one of the rings of the target, such that one of the bands corresponds to the outside-most ring of the target and another one of the bands corresponds to the inside-most ring of the target, each of the bands corresponding to a range of numeric values and having a unique visual indication, the visual representation including a data symbol that corresponds to each of a time series of numeric values of a statistic, each data symbol placed on at least one of the interpretive bands based at least in part on an interpretive rule that designates a corresponding interpretive band for each numeric value of the time series, each data symbol having the corresponding numeric value placed simultaneously in proximity with the data symbol.

17. The display device of claim 16 wherein each data symbol is a data dot displayed in a color that represents interpretive information associated with the corresponding numeric value of the time series.

18. The display device of claim 16 wherein the data structure represents a user interface control.

19. The display device of claim 16 wherein the visual representation includes an indication of a control that is selectable by a user for toggling between a numeric view and an interpreted view.

20. The display device of claim 16 wherein the unique visual indicator is a color.

21. The display device of claim 16 wherein the interpretive bands include a corresponding band of color for each ring associated with the archery target.

22. A computer system configured to present a visual representation of a series of numeric values of a statistic over a designated period of time according to a frequency, the computing system comprising:
a display screen;
a memory; and
a viewer component stored in the memory, and configured when executed to,
display on the display screen a visual representation of a roll-out from an archery target image having one or more rings emanating outward from the center of the target, each ring extending in an x-direction over the roll-out representation to generate a plurality of consecutive visual bands, wherein the lowermost band corresponds to the outside most ring of the target and the uppermost band corresponds to the inside most ring of the target, each band corresponding to at least one of one or more interpretive zones, each interpretive zone associated with a unique visual characteristic that is used to display the corresponding band;
for each numeric value of the series of numeric values of the statistic over the designated period of time according to the frequency,
determine at least one of the one or more interpretive zones to associate with the numeric value; and
display on the display screen a symbolic representation of the numeric value on the displayed representation of the roll-out within the band that is associated with the determined one or more interpretive zones associated with the numeric value, simultaneously with the corresponding numeric value, such that the roll-out representation displays the symbolic representation of each value of the series in a location along an x-axis direction and a y-axis direction in proximity to each corresponding numeric value.

* * * * *